United States Patent [19]

Bierlein

[11] 3,760,385

[45] Sept. 18, 1973

[54] OPTICAL SCANNER

[75] Inventor: John David Bierlein, Wilmington, Del.

[73] Assignee: E.I. du Pont de Nemouss and Company, Wilmington, Del.

[22] Filed: June 30, 1971

[21] Appl. No.: 158,368

[52] U.S. Cl.340/174 YC, 340/174 EB, 340/174 PM, 340/174 TF

[51] Int. Cl. ........................ G11c 11/14, G11c 11/42

[58] Field of Search ............... 340/174 TF, 174 YC, 340/174.1 M

[56] References Cited

UNITED STATES PATENTS

| | | | |
|---|---|---|---|
| 3,526,883 | 9/1970 | Tabor | 340/174 YC |
| 3,638,206 | 1/1972 | Thiele | 340/174 TF |
| 3,540,019 | 11/1970 | Bobeck et al. | 340/174 YC |
| 3,596,261 | 7/1971 | Perneski | 340/174 YC |
| 3,633,185 | 1/1972 | Danylchuk | 340/174 YC |

*Primary Examiner*—James W. Moffitt
*Attorney*—D. R. J. Boyd

[57] ABSTRACT

In certain optically transparent ferrimagnetic and ferromagnetic crystal plates wherein the easy axis of magnetization is normal to the plate, reversed cylindrical magnetic domains can be generated and maintained in a stable but mobile condition. Tracks defined by bands of magnetic material along which a magnetic gradient is generated can be employed to move the bubble domains while maintaining their optically accessible area substantially constant. Polarized light passing through the plate is passed through an analyzer set to distinguish the differing rotation of light in the domain by the Faraday effect. In one embodiment, a scanner with a spiral track is used to record electrical signals, such as audio signals on photosensitive media, and to play back the same. The intensity of the light passing the scanner can be modulated or the area of the reversed cylindrical domain can be modulated to provide either density modulation or area modulation in the recording process.

11 Claims, 12 Drawing Figures

INVENTOR

JOHN DAVID BIERLEIN

BY D.R. Boyd.

ATTORNEY

INVENTOR
JOHN DAVID BIERLEIN
BY D R Boyd
ATTORNEY

INVENTOR
JOHN DAVID BIERLEIN
BY
ATTORNEY

INVENTOR

JOHN DAVID BIERLEIN

BY [signature]

ATTORNEY

OPTICAL SCANNER

FIELD OF THE INVENTION

This invention relates to an apparatus for producing an optical scan in response to control signals, and to devices utilizing such an optical scanner for the recording and the playback of signals such as audio signals.

THE PRIOR ART

Reversed cylindrical magnetic domains in single crystal plates or films of certain ferromagnetic and ferrimagnetic materials which have an easy axis of magnetization normal to the surface, sometimes called bubble domains, have been utilized in connection with logic elements such as shift registers, Bobeck U.S. Pat. No. 3,460,104 and U.S. Pat. No. 3,470,546 and by Bobeck et al. U.S. Pat. No. 3,460,116. Patterned tracks, including T-bar tracks and "angelfish" tracks were employed to produce discrete movements of bubble domains in response to control signals. The Faraday effect was used to observe the movement of the domains along such tracks visually.

SUMMARY OF THE INVENTION

The present invention comprises an optical scanner having:

i. a plate of an optically transparent single crystal magnetic material capable of supporting mobile reversed cylindrical magnetic domains;

ii. means to apply a bias magnetic field to the plate to maintain the domains;

iii. means to generate a magnetic field gradient at the plate whereby the domains move in a uniformly continuous manner along a continuous track in said plate, said track being optically accessible over at least a major portion of said domain;

iv. means to generate the domains and position them on the track;

v. means to direct a beam of polarized light through the plate; and vi. analyzer means to discriminate between light passing through a domain and light passing through the surrounding plate.

In one embodiment there is provided a series of tracks each defined by a pair of parallel, magnetically soft uniaxial overlay films having their easy axis along the path and each pair joined at the start of said track to provide a common domain nucleating station. The overlay is initially magnetized so that the polarity at the nucleating station is opposite to the polarity of the nearest end of a reversed cylindrical domain injected under the nucleating station. A small transverse magnetic field is applied opposing the magnetization of the track. When the reversed cylindrical domain is injected under the nucleating station the field of the reversed cylindrical domain together with the transverse field is sufficient to nucleate a domain wall in the magnetic overlay film, which wall moves along the film and divides into two substantially colinear walls in the pair of films defining the track, the pair of walls continuing to move under the influence of the transverse magnetic field to the end of the track. The field gradient at said walls drives the reversed cylindrical domain along the track with the walls. At the end of each track adjacent the nucleating station is a magnetic holding station for reversed cylindrical magnetic domains and electrical means to divide a reversed cylindrical domain located at a a holding station so that one reversed cylindrical domain is injected uder a nucleating station and a second reversed cylindrical domain is transferred to the next holding station in the sequence. Means to detect the presence of reversed cylindrical domains are provided near the end of each track, together with means to apply a pulse to the electrical means on detection of such a domain, whereby reversed cylindrical domains are injected into successive tracks in sequence, and to apply the transverse magnetic field. At the end of each scan, a pulse of reversed polarity magnetic field returns the track to the initial condition.

In another embodiment of this invention, the track is defined by a spiral of uniform width composed of a soft magnetic material such as Permalloy having means to generate reversed cylindrical domains at one end, preferably at the center of the spiral. The reversed cylindrical domains can be driven in a spiral track by a rotating magnetic field.

An optical scanner having a spiral track can be employed to record signals such as audio signals on a photosensitive plate, preferably a photographic plate, and to play back the recording.

i. The signals can be employed to modulate the intensity of the beam of polarized light. After passing through the analyzer the beam falls on a photographic plate which records the signal as an optical density modulation along the path of the light traversing the moving domain.

ii. The signal can be employed to modulate this bias field, the light intensity being maintained at a constant value, whereby the area of the bubble domain is modulated by the signal, which is then recorded as an area modulated signal along the path of the light traversing the moving domain.

In either case, the recording may be played back (after development of the photosensitive plate, if such is required) by replacing the recording in the optical path of the scanner so that the recorded track is in registration with the path of the domain, scanning the recording with the scanner and detecting the modulation of the light emerging from the scanner. A preferred method is to employ a collimated beam of light through the scanner and place a field lens system in the path of light emerging from the analyzer, whereby all light passing through the plate is brought to a focus. A detector of small area is placed at the focus of the field lens system to detect the modulation of the light.

In recording, it is essential that the photosensitive detector be placed in the optical path beyond the analyzer. In playing back the recording, the record may be placed anywhere in the optical path, although registration of the recording with the track is most easily obtained by replacing the recording in the location wherein the signal was recorded.

THE DRAWINGS AND DETAILED DESCRIPTION OF THE INVENTION

This invention will be better understood by reference to the drawings which accompany this specification. In the drawings, FIG. 1 is a sketch showing the configuration of a reversed cylindrical domain in a plate of certain ferrimagnetic or ferromagnetic materials.

FIG. 2*a* is a plane view of line or magnetic track for use in propagating reversed cylindrical domains.

FIG. 2*b* is a side view of the track of FIG. 2a.

FIG. 3 illustrates a plurality of parallel tracks on a magnetic plate and means to insert reversed cylindrical domains in sequence to provide a raster type scan.

FIGS. 3*a* and 3*b* illustrate the method of initiating the scan with the track of FIG. 3.

FIGS. 3*c* and 3*d* illustrate the method of insertion of a reversed cylindrical domain onto a track of FIG. 3, while providing a second such domain for sequential insertion into the adjacent track, and driving the reversed cylindrical domain along the track.

Figure 5:
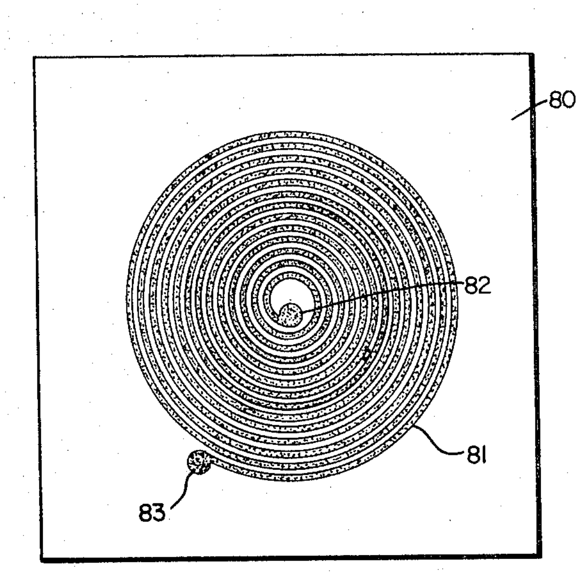
FIG. 5 illustrates a spiral track which can be employed in an optical scanner.
Figure 6B:
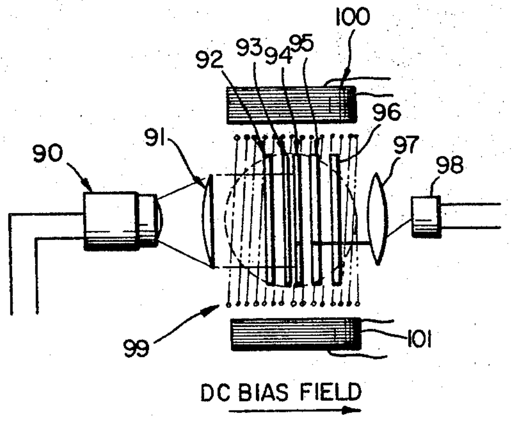
Figure 6A:
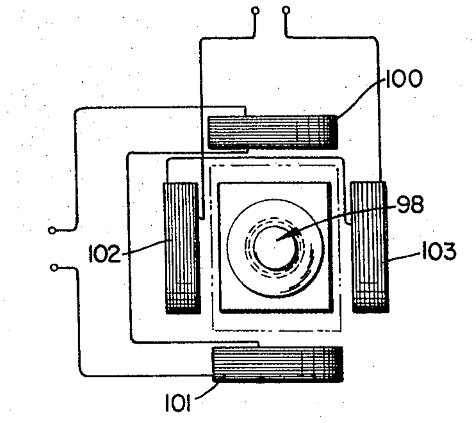

FIG. 6*a* is an end view of an optical scanning device utilizing the track of FIG. 5.

FIG. 6*b* is a side view of the apparatus of FIG. 6*a*.

Figure 1:
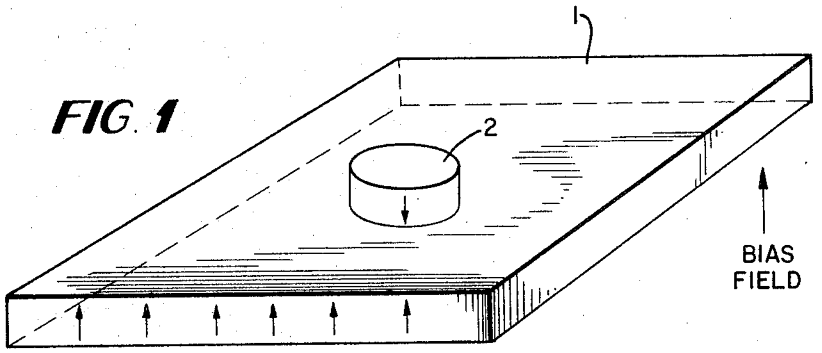

Referring now to FIG. 1, in the figure there is illustrated a magnetic plate bearing a reversed cylindrical magnetic domain.

The material requirements for suitable magnetic materials which will support reversed cylindrical magnetic domains have been set forth in detail by Gianola, Smith, Thiele and Van Uitert, IEEE Transactions on Magnetics, Vol. Mag-5, No. 3, September 1969 and numerous materials are listed therein.

Suitable magnetic materials exhibit uniaxial anisotropy, usually as the result of crystal structure such as the orthorhombic crystal structure exhibited by the orthoferrites although bubble domains have been observed in cubic materials such as the mixed rare earth garnets e.g., gadolinium iron garnet wherein suitable uniaxial anisotropy has been growth induced.

The plates are cut so that the easy axis of magnetization is perpendicular to the plane of the plate. Such plates in the "unmagnetized" condition exhibit a strip domain structure. On application of a suitable bias field directed perpendicular to the plate the strips collapse to small cylindrical structures wherein the polarity of the magnetization is reversed. As the field is further increased, the cylindrical domains decrease in diameter but remain stable up to a certain value of the field at which the domains collapse. The ratio of maximum to minimum domain diameter is about 3:1 for any plate thickness. The ratio of the bias field at which the domains run out into strips and the value at which the domains collapse is about 1.6:1 for very thin plates to 1:1 for thick plates. The optimum thickness of the plate, $d$, to give minimum domain diameter is given by:

$$d = (\sigma_w/\pi M_S^2)$$

wherein $\sigma_w$ is the 180° wall energy and $M_S$ is the saturation magnetization, both in c.g.s. units. At this thickness, the domain diameter is minimized and at the center of the stable region (from 1 to 1.4 times the field at run out) the bubble diameter is twice the plate thickness. The bias field for this condition is $1.2\pi M_S$.

In addition to the above criteria for the existence and stability of reversed cylindrical domains, it is necessary that the plates employed possess a sufficient Faraday rotation, preferably so that light passing through the domain wall be rotated a minimum of 0.5°, i.e., the minimum Faraday rotation should be $100/d$°/cm. This condition is usually satisfied. In general, Faraday rotation is a function of wavelength.

For use in the practice of this invention it is further necessary that the plate transmit an appreciable amount of light. In general the light source will illuminate the whole plate with polarized light, but only light transmitted through the domain will pass the analyzer. The maximum permissible absorption coefficient, $\alpha$, for the material will depend on the size of the domains, the intensity of illumination and the characteristics of the detector, as expressed by the relationship:

$$(A_D/A_S)e^{-\alpha d}\sin^{-2}(2\theta)I_{in} = P_n$$

where $\theta$ is the total rotation in the magnetic plate, $A_D$ is the area of the cylindrical domain, $A_S$ is the total scanning area of the plate, $I_{in}$ is the total power incident on the plate from the source and $P_n$ is the noise equivalent light power of the detector for the desired band width.

The minimum required mobility of the cylindrical domains in the platelet depends primarily on the domain velocity desired for the application and on the saturation magnetization of the platelet. The required mobility, $\mu$, can be calculated from the relation:

$$\mu = v/0.12\ M_S$$

where $v$ is the domain velocity and $M_S$ is the saturation magnetization of the platelet.

An example of a material suitable for the practice of this invention is the mixed garnet $Eu_{0.09}Gd_{2.32}Tb_{0.59}Fe_{5.0}O_{12}$. This material has $M_S \cong 20$emu/gm. For a platelet 0.001 inch in thickness, the domain diamter can be varied from about 15$\mu$ with a bias field of 85 oe to 5$\mu$ at a bias field of 100 oe. When employed on a spiral track as described hereinafter, a rotating field of 5 to 10 oe is sufficient to drive the domains. The Faraday rotation is sufficient to permit the application of this material in the apparatus of this invention at wavelengths as great as 10,000 A. Operation with light in the region of 7,000 A is preferred to obtain a large Faraday rotation with relatively low absorption, and hence minimize the power required for the light source.

In FIG. 1 a plate, 1, of such a material cut perpendicular to the easy axis of magnetization is shown. In the presence of a bias field directed to magnetize the plate, under the condition discussed hereinabove, cylindrical domains of small diameter, 2, can be maintained, in which the polarity of the magnetization is in the reverse direction to the bulk of the plate. Such domains can be generated by increasing the bias field from a value below the "run out" value on a plate which is partially or fully demagnetized and contains strip domains, to a value above the run out value whereupon the domains collapse to reversed cylindrical magnetic domains. Alternately, the plate can be fully magnetized and placed in a bias field suitable for maintaining reversed cylindrical magnetic domains, and such domains can be generated by application of a local magnetic field opposed to the bias field which can be generated, for example by electrical current flowing in a small loop in the plane of the plate. Reversed cylindrical domains can also be created by division of an existing reversed cylindrical domain as is taught by Bobeck et al., IEEE Transaction on Magnetics, Vol. Mag-5, No. 3, Sept. 1969, p. 544 and Perneski, ibid p. 544.

If the bias field is not uniform, the reversed cylindrical magnetic domains will move in the plate to minimize their energy. This property has been utilized to move such domains in a controlled manner by the application of local magnetic fields, i.e., by provision of "tracks" of soft magnetic material wherein poles can be generated by externally applied fields and by passing current through conductors. Heretofore such tracks have been employed to produce periodically ranging motion of reversed cylindrical domains for applications in computer logic elements such as shift registers, ring counters and the like.

Reversed cylindrical domains tend to repel each other at large distances. However, when the cylindrical domains approach within about 3 diameters they coalesce to a single reversed cylindrical domain.

It has been discovered that reversed cylindrical domains can also be moved along essentially uniform tracks in a uniformly continuous and optically accessible manner while maintaining an essentially constant diameter. The Faraday effect can then be utilized so that, on illumination of the plate with polarized light, the light passing through the region of the reversed cylindrical domain can be isolated. Thus there is provided useful optical scanning devices.

In the context of the present invention, the term "track" is employed to denote the path of the reversed cylindrical domain in the magnetic plate, and is to be distinguished from apparatus such as soft magnetic overlays which are employed in conjunction with magnetic fields to create field gradients which define the track and move the reversed cylindrical magnetic domains.

Magnetic thin film overlays need not be deposited on the face of the magnetic plate although they must be adjacent thereto so that the magnetic plate is exposed to the field thereof. In most instances, the track is defined by a pair of magnetic overlays having a constant spacing of the order of the domain diameter. If the track thus defined is curved, the field gradient necessary to position and move the reversed cylindrical domain can be generated by a rotating magnetic field. With linear tracks, the field gradient required can be generated by the local magnetic field of domain walls in the magnetic overlays which can be moved along the overlay in response to a field.

Figure 2A:
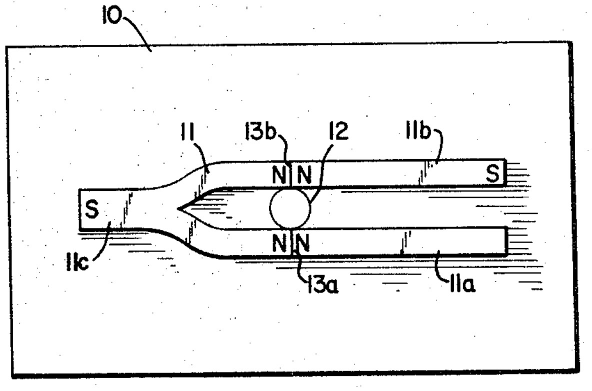
Figure 2B:
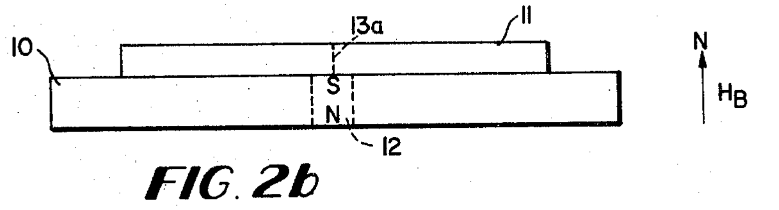

FIG. 2*a* is a plane view of a magnetic plate having a magnetic overlay forming a linear track. FIG. 2*b* is a side view of the magnetic plate of FIG. 2*a*, in which the same numbering is employed.

In FIGS. 2*a* and 2*b* a plate of ferromagnetic or ferrimagnetic material capable of supporting reversed cylindrical domains, 10, is magnetized and placed in a bias field directed as indicated by $H_B$ in FIG. 2*b* having an intensity sufficient to support reversed cylindrical domains. An overlay of a soft magnetic material 11 is placed on or adjacent to plate 10. The overlay consists of two parallel strips 11*a* and 11*b* of a relatively soft magnetic metal such as Permalloy having uniaxial magnetic anisotropy directed along the length of the strips which merge to a single strip 11*c* at the "start" of the track to form a nucleating station. In FIGS. 2*a* and 2*b* the track is adjacent the south pole of a reversed cylindrical magnetic domain. At the initiation of the process of moving the cylindrical domain along the track, the magnetic overlay 11 is magnetized to a single domain structure having a south pole at the 11*c* and north poles at each of strips 11*a* and 11*b*. A small transverse bias field directed to oppose the magnetization of the magnetic overlay 11 and sufficient to move domain walls along strips 11*a* and 11*b* is applied and a reversed cylindrical domain is then injected under the nucleating station 11*c* of the overlay. Means for injecting such a reversed cylindrical domain will be described hereinafter. The field from the reversed cylindrical domain in cooperation with the transverse field nucleates a domain wall in strip 11 at the nucleating station which then moves under the influence of the transverse field, dividing into two colinear domain walls 13*a* and 13*b* in strips 11*a* and 11*b*. The speed at which the domain wall traverses the magnetic overlay 11 can be controlled by the intensity of the transverse magnetic field. The magnetic field gradient at the domain wall drives the reversed cylindrical domain along a linear track between strips 11*a* and 11*b* where it is optically accessible.

Figure 3:
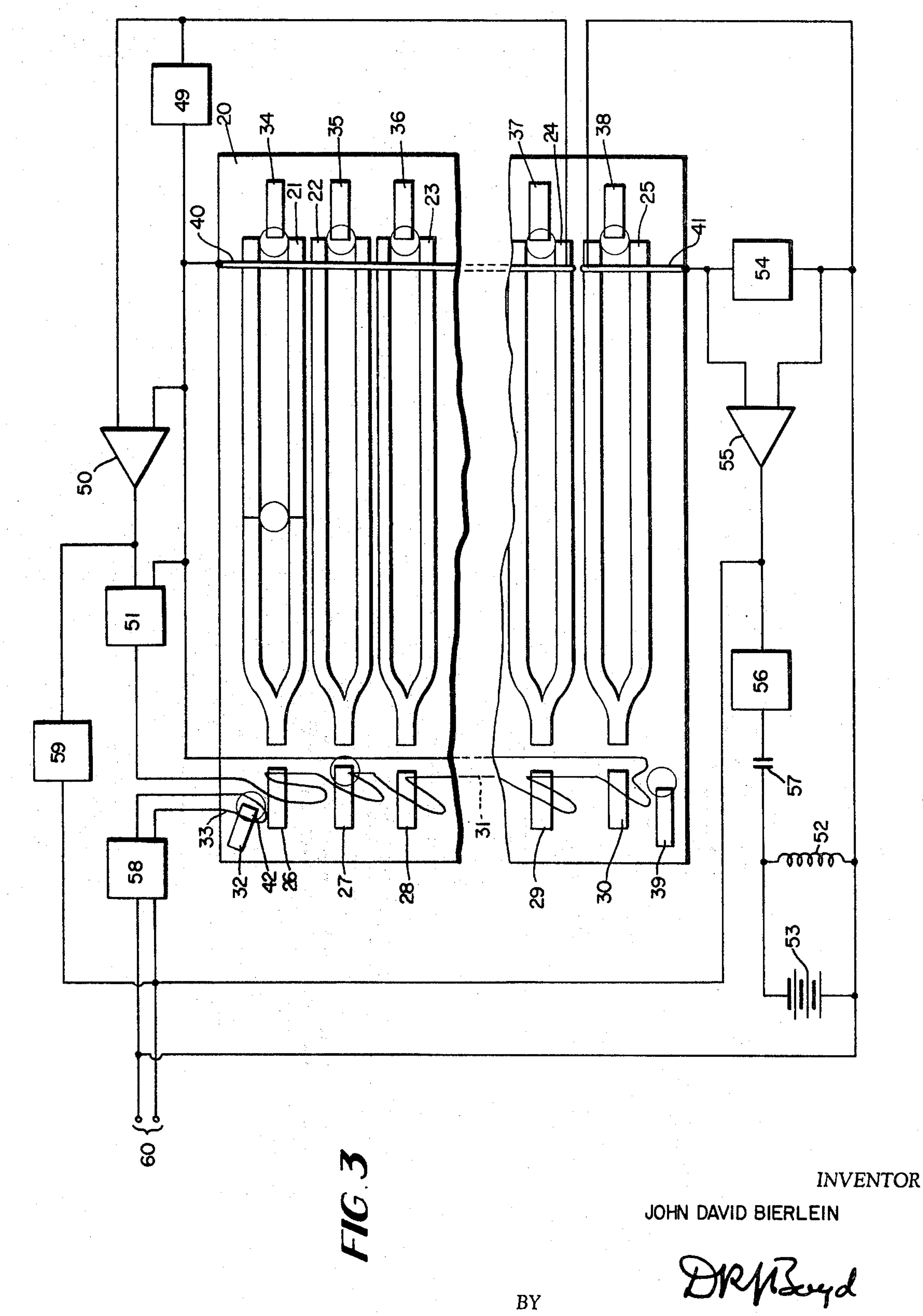
Figure 3A:
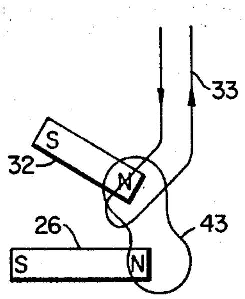
Figure 3B:
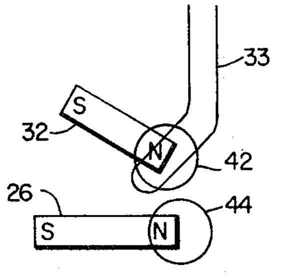

FIG. 3 illustrates apparatus using a plurality of overlays such as that of FIGS. 2*a* and 2*b* together with means to generate reversed cylindrical domains and direct a sequence of such domains down successive tracks. In FIG. 3, a plate of magnetic material, 20, capable of supporting reversed cylindrical magnetic domains, and maintained in a suitable bias field to support such domains by suitable magnetic means (not shown) has a series of magnetic overlays 21, 22, 23, 24 and 25 composed of a magnetic material with a low coercivity which is uniaxially magnetically anisotropic with the easy axis of magnetization directed along the length of the members. Each of the magnetic overlays 21 to 25 has the form of overlay 11 of FIG. 2, providing a track along which a reversed cylindrical domain can be moved. Opposite the nucleating station of each of the overlays 21 to 25 is a holding station 26, 27, 28, 29 and 30 each composed of an overlay of a hard magnetic material such as an iron-cobalt alloy, magnetized to retain reversed cylindrical domains at the end of each adjacent a nucleating station. An electric circuit hereinafter referred to as a "fishbone" circuit 31 is deposited as a thin film electrically insulated from a holding station and having the configuration shown in FIG. 3. A small permanent magnetic overlay 32 is located near the end of the fishbone circuit close to holding station 26, and is provided with a "hairpin" electrical circuit 33. The magnet 32 forms a storage location for a reversed cylindrical domain which can be divided by a pulse of current through the hairpin loop 33 to insert one reversed cylindrical domain onto holding station 26 at the start of the scanning operation, while retaining a reversed cylindrical domain at storage location magnet 32 for subsequent division on initiation of a new scan.

Adjacent the ends of the tracks formed by overlays 21 to 25 are small permanent magnet overlays 34, 35, 36, 37, and 38 which serve to retain reversed cylindrical domains which have traversed the tracks formed by overlays 21 to 25. A permanent magnet 39 is located near the end of the fishbone circuit as a storage location for reversed cylindrical domains.

Adjacent the ends of overlays 21 to 24 a detector strip 40 composed of a magneto-resistive material such as Permalloy, which changes in resistance when a reversed cylindrical domain passes thereunder, is placed crossing the tracks. A second, similar, detector strip, 41, is provided across the terminal track formed by overlay 25.

The method of operation of the device will be better understood by reference to FIGS. 3*a*, 3*b*, 3*c* and 3*d* wherein the parts have the same numbering as in FIG.

3 and which show portions of the magnetic overlays and the electrical circuitry.

In FIG. 3 a reversed cylindrical domain 42 is shown located adjacent the end of magnet 34. On application of a pulse of current in circuit 33 creating a local magnetic field opposing the bias, the domain will elongate as shown by 43 of FIG. 3*a* and divide into two reversed cylindrical domains as shown by 42 and 44 of FIG. 3*b*, each being equivalent to the original reversed cylindrical domains. The effect of the pulse of circuit in circuit 33 is to produce a new reversed cylindrical domain, 44, at holding station 26 while retaining reversed cylindrical domain 42 at station 32.

Figures 3C, 3D:
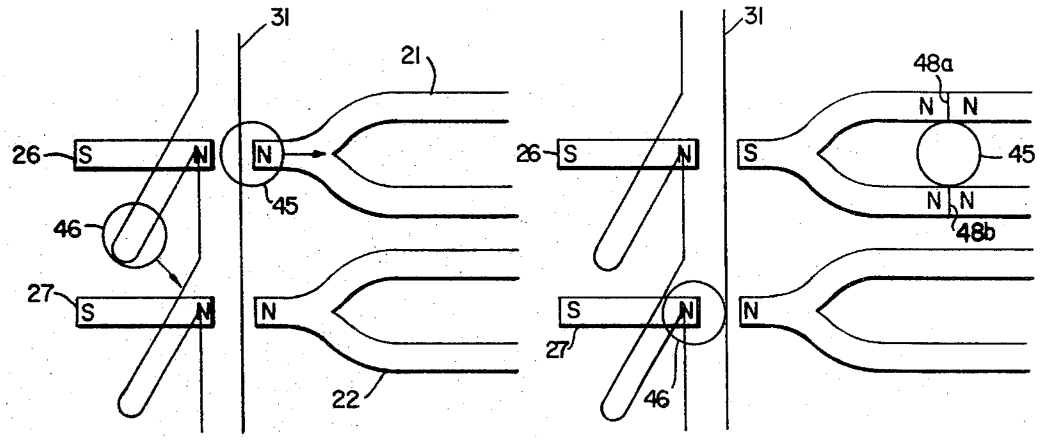

In FIG. 3*c* the effect of a pulse of current in fishbone circuit 31 on a reversed cylindrical domain such as 44 located under holding station 26 is shown. The reversed cylindrical domain divides into domain 45 which is injected under the nucleating station of overlay 21 and a second domain 46. The effect of injected reversed cylindrical domain 45 coupled with the transverse field is to nucleate a domain wall in overlay 21 which travels along the overlay under the influence of the transverse field carrying the reversed cylindrical domain 45 and divides into colinear domain walls 48*a* and 48*b* as shown in FIG. 3*d*. The second reversed cylindrical domain is retained on the next holding station 27. When reversed cylindrical domain 45 is detected by the detector strip 40 a pulse is applied to the fishbone circuit.

Returning to FIG. 3, detector strip 40 is placed in circuit with a current source 49. The passage of a reversed cylindrical domain across the detector strip generates a voltage across the current source which is amplified by amplifier 50 and employed to trigger a pulse generator 51 which applies a pulse to the fishbone circuit 31. The transverse bias field required to move the domain walls in the magnetic overlays 21 to 25 is provided by coils adjacent the plate represented by 52 through which a current is supplied by a power supply represented by battery 53. When a reversed cylindrical domain is injected under the nucleating station of overlay 25 and travels down the track formed by 25 it is detected by the separate detector strip 41 across which is connected a current source 54. The voltage generated across 54 is amplified by amplifier 55. The signal from 55 is applied to pulse generator 56 which applies a pulse of current of reversed polarity through the magnetic field coils 52 to reset the magnetic overlays 21 to 25 in the required initial condition. The generator 56 is isolated from coil 52 by a condenser 57. Simultaneously, the voltage from 55 is applied to a pulse generator 58 which applies a pulse to circuit 33, thus generating a reversed cylindrical domain at holding station 26 ready to start a new cycle. The pulse from 55 is also applied through a time delay circuit 59 to pulse generator 51 initiating a new cycle. The scanning process can be initiated by a pulse applied to terminals 60 and terminated at the end of any cycle by interrupting the circuit between amplifier 55 and pulse generator 58.

The reversed cylindrical domains which travel along the tracks are retained at the ends thereof by permanent magnets 34 to 38. Subsequent reversed cylindrical domains coalesce with the retained domains. Likewise, the second reversed cylindrical domain generated at the terminal holding station 30 is retained by magnet 39. In subsequent cycles, the second reversed cylindrical domain produced at station 30 by operation of the fishbone circuit coalesces with the retained reversed cylindrical domain.

Figure 4:
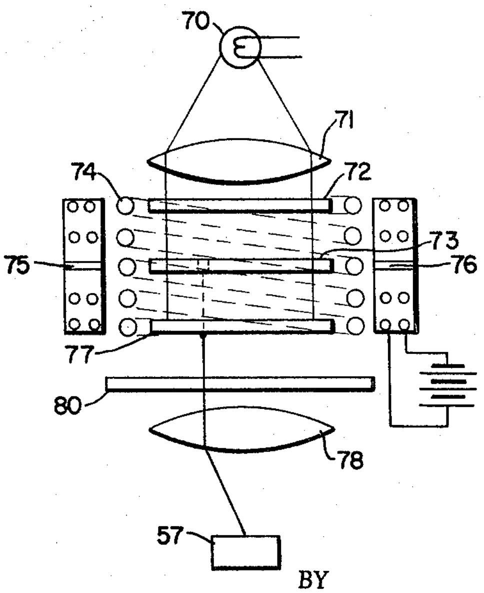
FIG. 4 illustrates an optical scanning device utilizing a magnetic plate capable of supporting reversed cylindrical domains with the track of FIG. 3.

FIG. 4 illustrates the use of a track such as that of FIG. 3 in an optical scanner. A point source of illumination 70 is placed at the focus of collimating lens system 71. The collimated light then passes through a polarizer 72, and then through magnetic plate 73 having the electrical and magnetic circuitry to provide the desired motion of the reversed cylindrical magnetic domain. The bias field necessary to support the reversed cylindrical magnetic domains in plate 73 is supplied by the surrounding solenoid 74. Coils 75 and 76 (corresponding to coil 52 of FIG. 3) supply the required transverse field. The light then passes through an analyzer 77 which is set to extinguish light passing through the plate in the absence of reversed cylindrical domains. The light transversing the cylindrical domain has its plane of polarization rotated relative to the plane of polarization of light passing the remainder of the plate and is transmitted, in part, by the analyzer. The light passing the analyzer is imaged by a field lens system 78 onto an optical light detector 57 such as photodiode. An optical transparency bearing information, 80, is placed in the path of the collimated light between lens system 71 and lens system 78. In FIG. 4, the transparency is shown positioned between the analyzer 77 and the field lens system 78, however, the placement is not critical and could be between elements 71 and 72, 72 and 73 or 73 and 77. Using the scanning member of FIG. 3 the optical transparency is scanned in a sequence of lines similar to a television raster except that flyback is absent. The detector 57 then records the modulation of the light. Signals indicating the start of each line of scan can be obtained from the detector strip "fishbone" circuit of FIG. 3.

The region of the magnetic plate containing the holding stations 26 to 30, the generator 32, terminal member 39, and the ends of the overlays nucleating and holding station for retaining reversed cylindrical domains should be optically masked so that only the reversed cylindrical magnetic domains moving along the tracks are in the optical path.

FIG. 5 illustrates another form of track which can be employed for optical scanning. In FIG. 5, a plate of a magnetic crystal capable of supporting reversed cylindrical magnetic domains, 80, is provided with an overlay consisting of a strip of soft magnetic material such as Permalloy of constant width in an Archimedes spiral, 81. An Archimedes spiral is characterized by the pitch $a$ in the equation $r = \theta a$ where $r$ is the radius from the center of the spiral, $\theta$ is the total angle traversed from the center, and by the track width $w$. It is essential that $w<a$, since if $w = a$ the overlay becomes a solid disc. To avoid overlap of the scan with reversed cylindrical domains of diameter $p$, the track width should be greater than $p/2$. Accordingly $$(p/2) < w < a$$

for spiral overlays useful in the practice of this invention.

Near or at the center, the spiral terminates in a disc of Permalloy 82 which serves as a holding and generator station for reversed cylindrical domains. The outer end of the spiral terminates in a disc of Permalloy, 83, which likewise serves as a holding station for reversed cylindrical magnetic domains. A bias field directed perpendicular to the plane of the magnetic plate must be provided to maintain reversed cylindrical magnetic domains in the plate. Such domains can be propagated along the magnetic track by a rotating magnetic field in the plane of the magnetic members.

The reversed cylindrical domain is propagated along the spiral track by the combined effects of the rotating magnetic field, Permalloy track and the domain itself. The rotating field magnetizes the Permalloy producing a field gradient in the region of the domain. In the presence of this gradient, the domain is attracted to one edge of the Permalloy track. Since Permalloy has a low coercivity and a high permeability, its magnetization follows that of the rotating field producing a rotating gradient which in turn drives the domain along the track. A domain is initiated along this track by reducing the bias field momentarily which increases the size of a "generator" domain located at the center Permalloy disc 82. As the transverse field rotates, this domain tends both to continue around the circle and also to start along the spiral. This action elongates the reversed cylindrical domain and eventually will break the single reversed cylindrical domain into two reversed cylindrical domains. Before another cycle of the transverse field is completed and another domain generated, the d.c. bias field is returned to its original value, allowing only one domain to propagate along the spiral until the field is again reduced. The reversed cylindrical domain then travels along the spiral track following the rotation of the transverse field until, at the other end of track it is trapped on the Permalloy disc 83. Subsequent domains which are generated and driven along the spiral track will coalesce with the domain already located at disc 83.

With provision of a rotating magnetic field in the plane of the magnetic plate, the track of FIG. 5 can be employed in the apparatus of FIG. 4.

An optical scanner employing the spiral overlay of FIG. 5 can be used to record and play back electrical signals such as audio signals. The apparatus employed is shown in FIGS. 6*a* and 6*b*, wherein like numbers refer to like elements. Referring to FIGS. 6*a* and 6*b* a light source 90 is collimated by a lens system 91 to a beam which passes through a polarizer 92, a transparent plate 93 bearing the spiral track of FIG. 5, a plate of magnetic material capable of supporting reversed cylindrical magnetic domain 94, which can conveniently be cemented to the plate 93 bearing the track, to an analyzer. The analyzer 95 is oriented to block the polarized light transmitted by the plate in the absence of reversed cylindrical domains. Light passing through a reversed cylindrical domain on plate 94 is transmitted in part by the analyzer 95 as a spot of light on plate 96 which traverses a spiral pattern as the domain traverses the spiral track. A lens system 97 is provided to focus the light passing plate 96 onto a light detector 98.

The bias field required to maintain the reversed cylindrical domain is supplied by a solenoid 99. The rotating magnetic field transverse to the magnetic plate is provided by two pairs of coils 100, 101, 102, and 103. An alternating current of the desired frequency of rotation is supplied to coils 100 and 101 and the same alternating current is supplied in quadrature to coils 102 and 103.

In recording, plate 96 is an unexposed photographic plate or similar light sensitive detector. A reversed cylindrical magnetic domain is generated by pulsing the direct current supplied to the solenoidal coil 99 and driven along the spiral track by the rotating field supplied by coils 100, 101, 102 and 103 in the manner described above. The light transmitted by the analyzer 95 to the photographic plate 96 can be modulated directly by modulating the intensity of lamp 90 to give a density modulated recording on the photographic plate. For this purpose it is convenient to employ a light emitting diode as the light source, which can be modulated at high frequencies.

Instead of modulating the light source, a constant source of light can be employed and the diameter of the reversed cylindrical magnetic domain can be modulated by modulating the bias field supplied by the solenoid 97. The range of the applied field is about 0.5 $\pi M_S$ wherein $M_S$ is the saturation magnetization of the magnetic plate. This range provides about 300 percent variation in the diameter of the domain. Provided the track width is at least the maximum domain diameter, and the light intensity is sufficient to fully expose the photographic record, this method of recording produces an area modulated track.

The total recording time at constant rotation frequency provided by such a track is $$(\pi L^2/2apf)$$

where $L$ is the overall diameter of the spiral overlay, $p$ is the domain diameter in the same units and $a$ is the pitch of the spiral. The minimum required frequency of the rotating field is $pf/\pi L$. Thus substantial playing time can be achieved with recordings of small diameter. The playing time can be improved twofold by providing a rotating field whose frequency is raised to provide a constant line or speed of reversed cylindrical domain along the track. The rotational frequency required to produce a constant line speed pt is $pt/2\pi r$ where $r$ is the instantaneous radial distance of the reversed cylindrical domain from the center of the spiral overlay.

After recording, the photographic plate is developed. The recording can then be played back by replacing the developed photographic plate in the optical path in registration with the spiral track, driving a reversed cylindrical domain along the track with constant bias field and constant light intensity in the illumination system, detecting the variation in the light intensity at detector 98 of FIG. 6*a*, amplifying the resultant signal and applying it to an acoustic transducer such as a loud speaker.

For example, by varying the magnetic field bias applied to a 0.001 inch thick platelet of the mixed garnet $Eu_{0.09}Gd_{2.32}Tb_{0.59}Fe_{5.0}O_{12}$ between 85 and 100 oe, the domain diameter varies between 15$\mu$ and 5$\mu$. Although this variation is large enough to allow for either amplitude or density modulation, to get maximum playing time, density modulation is preferred along with a bias field of 100 oe. To provide a field gradient large enough to drive the domain along the guiding track, the transverse rotating field should be in the 5 to 10 oe range and the thickness of the track should be at least 5,000 A. An example of a detector is the silicon diffused pin photodiode (EG & G, Inc., No. SGD-040) with a $4 \times 10^{-12}$ watt minimum detectable light level for a 10 kc bandwidth. When the analyzer and polarizer are 5° from extinction, this minimum detectability requires at least a 10 mw source. These sources are common and are available in both light emitting diode and incandescent lamp types.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. An optical scanner apparatus comprising:
   a plate of an optically transparent magnetic material capable of supporting mobile reversed cyclindrical magnetic domains,
   means to apply a bias magnetic field to said plate to maintain reversed cylindrical domains,
   magnetic overlay means defining at least one continuous track of uniform width in said plate, said track being optically accessible,
   means to generate a moving magnetic gradient in each said overlay whereby the domains on said track move along said track in a uniformly continuous manner;
   means to generate reversed cylindrical magnetic domains and position them on said track;
   means to direct a beam of polarized light through said plate; and
   analyzer means to discriminate between light passing through a reversed cyclindrical domain and light passing through the remainder of said plate.

2. Apparatus of claim 1 wherein said analyzer is set to transmit light passing through said reversed cylindrical magnetic domains and to extinguish light passing through the remainder of said plate.

3. Apparatus of claim 2 wherein said track is defined by a pair of parallel magnetically soft magnetically uniaxial overlays joined at the start of said track to form a nucleating station;
   means to magnetize said overlay whereby the polarity of said nucleating station is opposite to the polarity of the end of a reversed cylindrical domain adjacent said track;
   means to inject a reversed cylindrical domain under said nucleating station; and
   means to apply a magnetic field to said overlay opposed to the magnetization thereof whereby on injecting a reversed cylindrical domain under said nucleating station, a domain wall is created in said nucleating station adjacent said reversed cylindrical domain and travels down said overlay as two colinear domain walls carrying said reversed cylindrical domain along said track.

4. Apparatus comprising a plurality of the tracks of claim 3 in a parallel array, a permanent magnetic holding station overlay adjacent each nucleating station, and detector means adjacent to the end of each track to detect the presence of reversed cylindrical domains, electrical means to divide a reversed cylindrical domain at each holding station into a first reversed cylindrical domain and a second reversed cylindrical domain in response to a control signal from said detector means, each said holding station being arranged so that said first cylindrical domain is injected into the adjacent nucleating station and means to guide said second reversed cylindrical domain to the next holding station in sequence, whereby each said track is traversed by a reversed cylindrical domain in sequence.

5. Apparatus of claim 2 wherein said track is defined by an Archimedes spiral of a strip of soft magnetic material having uniform width in a rotating magnetic field.

6. Apparatus for the recording of signals comprising the optical scanner of claim 5 and additionally comprising means to modulate said beam of polarized light in response to signals to be recorded, while a reversed cylindrical domain is traversing said spiral track, a photographic plate adapted and arranged to record the modulated light passing said analyzer as an optical density modulation along the path of the light transversing the reversed cylindrical domain on said track.

7. Apparatus for the recording of signals comprising the optical scanner of claim 5, and additionally comprising means to modulate the magnetic field maintaining said reversed cylindrical magnetic domain in response to said signals whereby the area of said domain is modulated in accordance with said signals while said domain is traversing said track, and a photographic plate adapted and arranged to record the light passing said analyzer as an area modulation along the path of light traversing the reversed cylindrical domain on said track.

8. Apparatus for playing back recorded signals comprising the optical scanner of claim 5, a photographic plate in the path of light emerging from the analyzer having a photographic image consisting of a density modulated spiral in registration with the path of a reversed cylindrical magnetic domain in the path of light emerging from said analyzer, said modulation corresponding to said signals, and means to detect the modulation of light emerging from said photographic plate.

9. Apparatus of claim 8 including means to collimate the beam of polarized light incident on said plate of magnetic material, a field lens system adapted and arranged to focus light passing said photographic plate, said means to detect the modulation of light being positioned at the focus of said field lens system.

10. Apparatus for playing back recorded signals comprising the optical scanner of claim 5, a photographic plate in the path of light emerging from the analyzer having a photographic image consisting of an area modulated spiral track in registration with the path of a reversed cylindrical magnetic domain traversing said spiral track, said modulation corresponding to said signals, and means to detect the modulation of light emerging from said photographic plate.

11. Apparatus of claim 10 including means to collimate the beam of polarized light incident on said plate of magnetic material, a field lens system adapted and arranged to focus light passing said photographic plate, said means to detect the modulation of light being placed at the focus of said field lens system.

* * * * *

PO-1050
(5/69)

UNITED STATES PATENT OFFICE
CERTIFICATE OF CORRECTION

Patent No. 3,760,385 Dated September 18, 1973

Inventor(s) John David Bierlein

It is certified that error appears in the above-identified patent and that said Letters Patent are hereby corrected as shown below:

Column 2, line 1 - "a" is repeated.

Column 2, line 15 - "Permalloy" should read "Permalloy®". See also column 8, lines 48 ff and column 9, lines 7 ff.

Column 4, line 10 - in the equation, the term "....$e^{-d}$...." should read "....$e^{-\alpha d}$....".

Column 10, line 25 - the term does not need to be in parentheses.

Signed and seaLed this 16th day of July 1974.

(SEAL)
Attest:

McCOY M. GIBSON, JR.
Attesting Officer

C. MARSHALL DANN
Commissioner of Patents